United States Patent [19]
Reichmuth

[11] Patent Number: 4,730,683
[45] Date of Patent: Mar. 15, 1988

[54] ELECTROMAGNETIC LOAD-COMPENSATION WEIGHING APPARATUS INCLUDING TEMPERATURE COMPENSATION MEANS

[75] Inventor: Arthur Reichmuth, Wetzikon, Switzerland

[73] Assignee: Mettler Instrumente AG, Greifensee, Switzerland

[21] Appl. No.: 21,208

[22] Filed: Mar. 3, 1987

[30] Foreign Application Priority Data

Apr. 18, 1986 [CH] Switzerland ............... 1569/86

[51] Int. Cl.$^4$ ............................................. G01G 7/00
[52] U.S. Cl. ................................................. 177/212
[58] Field of Search ....................................... 177/212

[56] References Cited

U.S. PATENT DOCUMENTS 4,134,468 1/1979 Luchinger et al. .
4,457,386 7/1984 Schett et al. .
4,489,800 12/1984 Nufer et al. .

FOREIGN PATENT DOCUMENTS 2400881 7/1975 Fed. Rep. of Germany .
2819451 1/1979 Fed. Rep. of Germany .
3324402 2/1984 Fed. Rep. of Germany .
3340512 5/1985 Fed. Rep. of Germany .

Primary Examiner—George H. Miller, Jr.
Attorney, Agent, or Firm—Laubscher & Laubscher

[57] ABSTRACT

Weighing apparatus of the electromagnetic load compensation type is provided with a movable coil arranged in the air gap of a permanent magnet system, and which includes a load-compensation winding through which flows a load-dependent compensation current. As a temperature sensor for measuring the coil temperature, use is made of the coil, specifically, either the load winding itself or an additional winding that is in thermal contact with it. A resistance measuring device determines its temperature-dependent resistance from the voltage and the current on or in the winding. Accurate and real-time measurement of the coil temperature as a measure for controlling the compensation of its influence on the measurement reading is possible in this way.

9 Claims, 8 Drawing Figures

ELECTROMAGNETIC LOAD-COMPENSATION WEIGHING APPARATUS INCLUDING TEMPERATURE COMPENSATION MEANS

BRIEF DESCRIPTION OF THE PRIOR ART

This invention relates to weighing apparatus of the electromagnetic load-compensation type including a movable coil support that is arranged in the air gap of a stationary permanent magnet system, and which carries at least one load winding through which flows a load-responsive compensation current, together with temperature sensor means for measuring the coil temperature to control the compensation of its influence on the measurement reading.

Weighing systems of the electromagnetic load-compensation type possess the inherent disadvantage that, as a consequence of the particular compensation current, the power loss (heat output) of the load-compensation winding is a function of load. During the successive weighing of loads of various magnitudes, different amounts of power loss are also always produced and they, as we know, are proportional to the square of the current. As a consequence of the thus constantly changing temperatures in the system, there is an undesirable instability of the zero or null point, and possibly also of the sensitivity of the apparatus. This effect becomes particularly disturbing when scales of compact design—among others, with maximum utilization of the permanent magnet system—are to be given greater resolution. When the scales include a lever transmission element, there will also be temperature differences on the lever and they also will influence the sensitivity of measurement. The influence of differing temperatures on the permanent magnet system can, to be sure, be reduced by means of appropriately placed temperature sensors (as shown by the German Off. No. 33 24 402), but the influence of errors remains here on the basis of the temperature dynamics (heat inertia of the magnet system).

The above-described disadvantage is coupled with the difficulty of accurately detecting all interference magnitudes that contribute to the instability of the reading. The effort required for this as a rule is justified only in very high-resolution scales. In this connection, it is indispensable among other things to determine the temperature in the load winding as a measure of its power loss, and this must be done accurately and in terms of real time, in order to achieve a compensation of the load-dependent temperature influence upon the measurement result—a compensation, in other words, that will be effective over a broader temperature range. On the other hand, experiments have shown that the load-dependent indication errors are proportional, in good approximation, to the power loss in the load winding. On the basis of this finding, one can achieve an effective temperature compensation for high-resolution scales also with a lesser effort. The prerequisite for this, however, again is the most accurate possible recording of the temperature in the load winding.

The use of temperature compensation means in weighing apparatus of the load-compensation type has been previously proposed in the prior art, as evidenced for example, by the prior patents to Schett et al U.S. Pat. Nos. 4,457,386 and Nufer et al, 4,489,800, amount others.

Moreover, it has proposed, as shown, for example, by the German Off. No. 33 40 512, that a temperature sensor might be attached to the outside of the load winding. Solutions of this kind entail the disadvantage that the temperature sensor cannot be arranged in the center of the heat source or close enough to it. As a result, the measured temperature curve can follow the rear course only inaccurately.

The invention at hand was based on the task of measuring the temperature in the center of the heat source, that is to say, in the load winding.

SUMMARY OF THE INVENTION

According to a primary object of the present invention, the solution to this problem consists in the fact that a winding of the coil is used as a temperature sensor and that it is connected with a device for measuring its temperature-dependent resistance from voltage and current.

The load winding, through which flows the compensation current, is preferably used as the temperature sensor. But it is also possible to have the coil include—as a temperature sensor means—an additional winding that is arranged directly in thermal contact wtih the load winding.

By using a winding of the coil—that is arranged in the air gap of the permanent magnet system—as temperature sensor, one can guarantee accurate and real-time detection of the winding temperature. The latter—in case of constanttemperature temperature coefficient of the winding material—is in a linear ratio to the winding resistance.

The utilization of the measured resistance value is not a subject of this invention. It can be performed in the same or in a similar manner as in the known analog or digital correction circuits with other temperature sensors.

For the purpose of temperature compensation with lesser accuracy requirements, it is of course known that one can arrange an additional winding on the stationary permanent magnet system or on the coil that moves in the air gap of said system. This additional winding however is not provided as a temperture sensor for the accurate determination of the winding temperature; instead, it serves, for example, as temperature-dependent, nonlinear resistance in a correction network (German Patent No. 24 00 881) or as adjustable heating winding for keeping constant the electrical power loss generated in the coil as a whole (German Off. No. 28 19 451).

BRIEF DESCRIPTION OF THE DRAWING

Other objects and advantages of the invention will become apparent from a study of the following specification, when viewed in the light of the accompanying drawing, in which.

DETAILED DESCRIPTION

Figure 1:
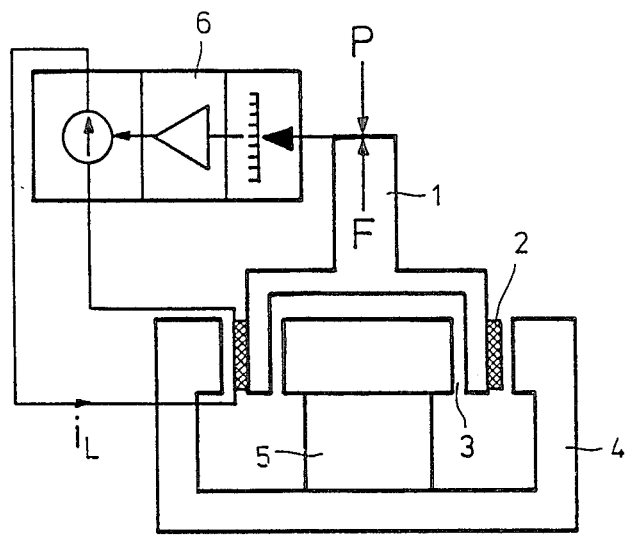
FIG. 1 is a schematic diagram of a basic weighing apparatus of the electromagnetic load-compensation return-to-zero type.

According to FIG. 1, the weighing apparatus includes a movable load support or platform 1 upon which is applied a force P which corresponds with the weight of the material to be weighed. The load support 1 carries a coil 2 which is arranged in the air gap 3 of a permanent magnet system 4 having a permanent magnet 5. Through the load winding of coil 2 flows a compensation current $i_L$ which generates in the magnetic field of the permanent magnet system 4 a restoring force F that works in opposition to the load force P. By means of the compensating current control means 6, which is responsive to the position of load holder 1 relative to the frame and the permanent magnet system, the compensation current $i_L$ is so regulated that the force F, which is proportional to the compensation current, maintains the scale in balance (i.e., at the null or no-load position), so that the intensity of compensation current $i_L$ thus represents a measure of the force P or of the weight of the material to be weighed.

Figure 2:
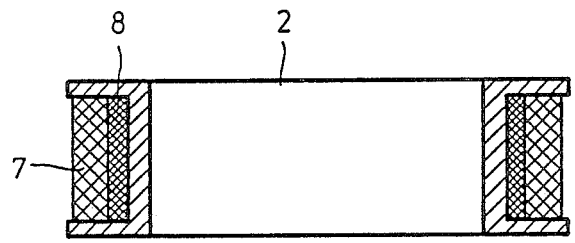
FIG. 2 is a longitudinal sectional view of the movable coil of FIG. 1, including, in accordance with the present invention, an additional winding serving as the temperature sensor.

Referring to the embodiment of FIG. 2, in order to sense the coil temperature, there is provided on coil support 2—in addition to the load winding 7—an additional winding 8 which serves as a temperature sensor means arranged, for example, inside load winding 7. This additional winding 8 can be placed inside the winding space in any desired manner; the essential thing is that it must be in direct thermal contact with load winding 7. Furthermore, the additional winding 8 should take up as little as possible of the available winding space and therefore consist of only a winding layer, whereby most of the winding space will be available for the load winding. For the additional winding, one can use winding wire consisting of copper or another electrically conducting preferably non-ferromagnetic material with an adequate, preferably high temperature coefficient.

In measuring the resistance $R_Z$ of additional winding 8 by means of voltage and current measurements, care must be taken to make sure that the current in the additional winding does not generate any additional force which would influence the force compensation and thus adulterate the measurement result. Such an error can be avoided if either the additional winding is made as a bifilar winding or as a meander or serpentine winding, and/or the resistance measurement is done with alternating-current power.

Figure 7:
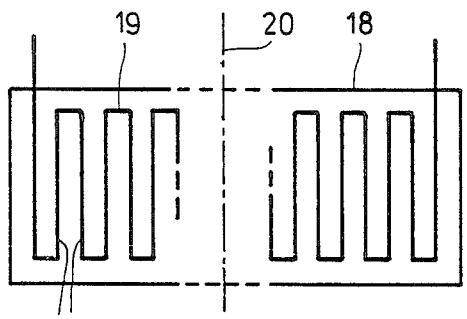
FIGS. 7 and 8 are schematic illustrations of two embodiments of the additional winding, respectively, each shown in an unwound mode.
Figure 8:
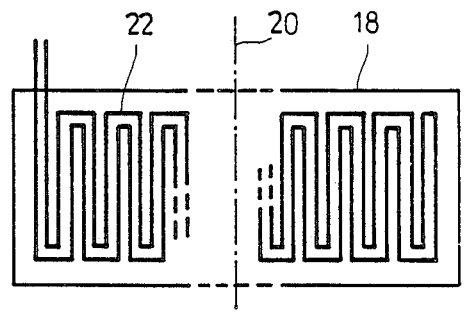

FIGS. 7 and 8 illustrate two versions of a meander or serpentine winding in the unwound planar mode. In both cases, the meander winding consists of a, for instance, printed circuit conductor on a band-shaped support layer 18 made of nonconducting material that is wound up on the coil body. According to FIG. 7, the meander-shaped, unifilar conductor path 19 is so arranged that the longer segments 19a of the conductor path run parallel to the coil axis 20 and thus, in case of current throughflow, do not generate an essential force component in the direction of the coil axis that would influence the force measurement. The conductor path 22 in FIG. 8—which represents a bifilar meander winding—is arranged in the same way.

Figure 6:
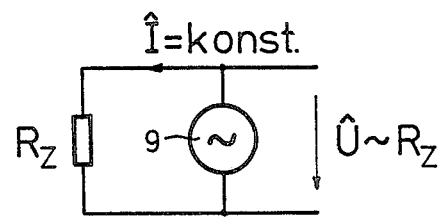
FIG. 6 is a schematic diagram illustrating an arrangement for measuring the resistance of an additional winding with the use of an alternating-current voltage source.

FIG. 6 shows a simple system for measuring the resistance $R_Z$ of the additional winding 8. An AC voltage source 9 supplies a sinusoidal current with constant maximum value $\hat{I}$, so that the voltage $\hat{U}$ is proportional to the resistance $R_Z$ and represents a direct measure of the coil temperature. The measurement current can also be rectangular or it can have any shape; however, its mean value must not deviate from zero.

A preferred version of the invention consists in the fact that the load-compensation winding, through which the compensation current flows, at the same time serves a temperature sensor. This solution variant provides the advantages that there are no longer any thermal contact points, i.e., the heating is detected in the same winding in which it is generated, so that no further mobile, load independent power supply to the coil is necessary, and that the entire winding space is available for the load winding.

Figure 3:
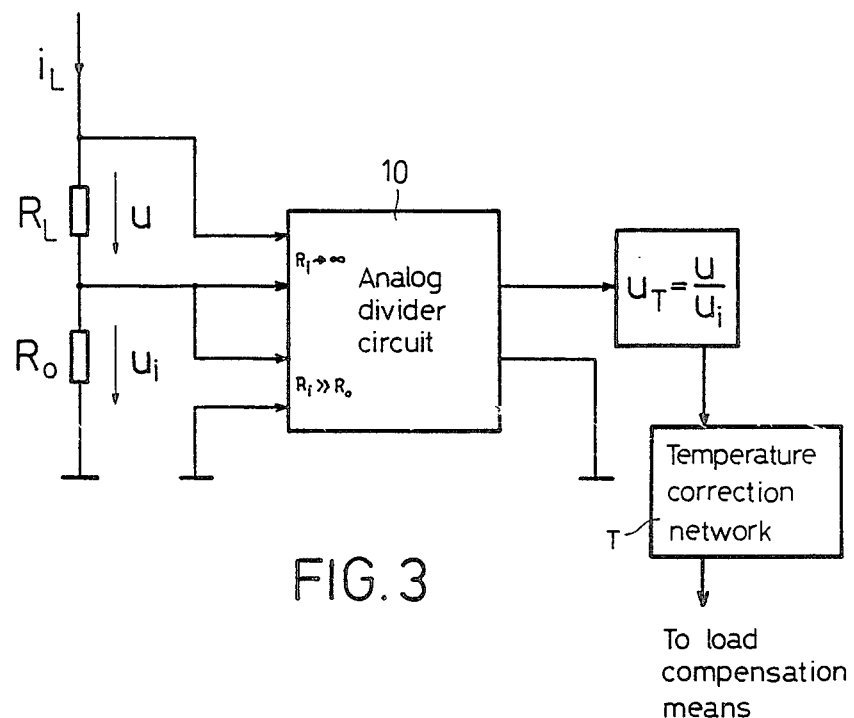
FIGS. 3-5 illustrate various arrangements for measuring the resistance of the load winding of FIG. 2.
Figure 4:
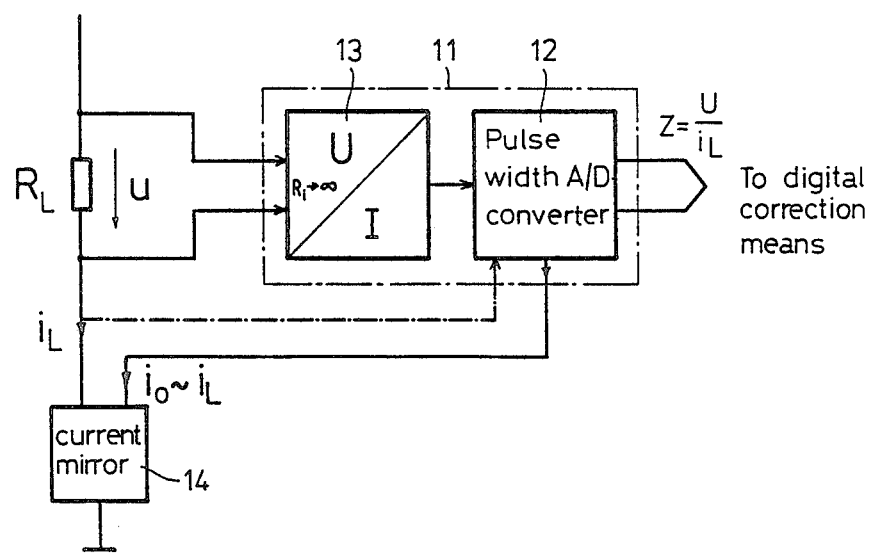
Figure 5:
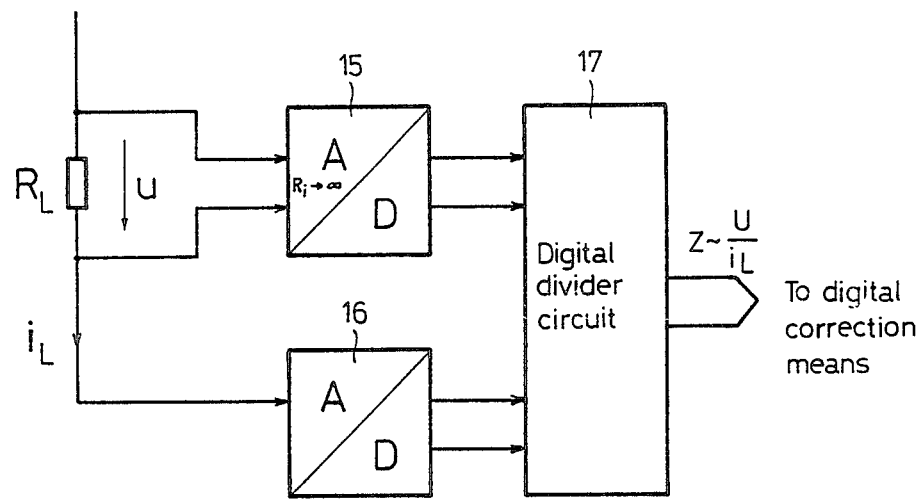

The measurement of the temperature-dependent resistance $R_L$ of the load winding is performed with a view to the variable, load-dependent compensation current fundamentally in such a manner that the voltage on the load winding and the current flowing through it are determined on the load winding and that the current flowing through the latter is measured, whereupon the quotient is determined from the measured values. Here, quotient determination can be performed with purely analog circuit means, with analog and digital means combined, or by means of digital computation. FIGS. 3 to 5 show several examples of this.

According to the circuit diagram in FIG. 3, the voltage u is tapped (i.e., measured) across the load winding having a resistance $R_L$ and through which the compensation current $i_L$ flows, thereby producing a voltage $u_i$ which is proportional to the current $i_L$ across a reference resistance $R_o$ through which the compensation current likewise flows and which has a constant resistance value. The two voltages u and $u_i$ are supplied to an analog dividing circuit 10 whose output signal $u_T$ represents the quotient $u/u_i$ and thus affords a measure of the resistance $R_L$ or of the coil temperature. In order, on the one hand, to refrain from affecting the weight measurement and, on the other hand, to achieve high resistance measurement accuracy, the input resistances $R_i$ of the dividing circuit 10 of FIG. 3 must be as high as possible. ($R_i \rightarrow \infty$ or $>>R_o$, respectively). The output signal is supplied to the temperature correction network T of the load-compensation means.

If the temperature value is to be present in digital form, then a dividing analog-to-digital converter 11, for example, according to FIG. 4, is suitable for resistance measurement. Because the temperature coefficient of the resistance $R_L$ of the load winding in case of copper as winding material is not too great with about 4 promille per degree (i.e., about 4 per thousand per degree), the A/D converter must have a correspondingly high resolution. This requirement can be met with a pulse-width converter 12. To the signal input of converter 12 a current is supplied which is proportional to the voltage u across the resistance $R_L$ of the load winding and which is obtained with a voltage/current converter 13, while via the reference input of converter 12 there flows a current $i_o$ which is proportional to compensation current $i_L$ and which is taken from a so-called current mirror 14. It is also possible to feed the compensation current $i_L$ directly into the converter 12 (as shown in phantom). The digital signal Z, which is obtained at the output of converter 12, represents the quotient from U and $i_L$.

In the circuit arrangement according to FIG. 5, there is provided, for the indication of the voltage value u and the current value $i_L$, a pair of analog-to-digital converters 15 or 16 whose output signals are supplied to a digital dividing circuit 17 which produces a signal Z that is proportional to the quotient from U and $i_L$. The A/D converter 16 can be omitted if the compensation current $i_L$ is already present in digital form, as is often the case in electromagnetically force-compensating scale.

What is claimed is:

1. weighing apparatus of the electromagnetic load compensation type, comprising:
   (a) stationary permanent magnet means (4);
   (b) a load-receiving member (1) mounted for movement relative to said permanent magnet means,
   (c) at least one load compensation winding (2) connected with said load receiving member;
   (d) means (6) for supplying load compensation current ($i_L$) to said load compensation winding for maintaining said load-receiving member at its initial no-load position, whereby the magnitude of said load compensation current is a function of the load applied to said load-receiving member; and
   (e) temperature-responsive means for generating a parameter for compensating for the influence of temperature changes in said load compensation winding on the measurement result, including:
      (1) sensor winding means on said movable load-receiving member; and
      (2) means (10; 11, 14; 15-17; 9) for measuring the temperature-dependent resistance ($R_L$; $R_Z$) of said sensor winding means as a function of its voltage (u; U) and current ($i_L$; I).

2. Apparatus as defined in claim 1, wherein said load compensation winding (7) comprises said sensor winding means.

3. Apparatus as defined in claim 2, wherein said means includes an analog dividing circuit (10) having a pair of inputs; and further including mean for supplying to said inputs a first signal which is proportional to the voltage (u) across said load compensation winding, and a second signal which is proportional to the current ($i_L$) flowing through said load compensation winding.

4. Apparatus as defined in claim 2, wherein said measuring means comprises a dividing A/D converter (11); and further including means for supplying to a first input of said converter a signal that is proportional to the voltage (u) across said load compensation winding, and means for supplying to a reference input to said converter a signal ($i_o$) that is proportional to the current ($i_L$) in said load compensation winding.

5. Apparatus as defined in claim 4, wherein said A/D converter is a pulse-width converter (12).

6. Apparatus as defined in claim 2, wherein said measuring means includes digital divider means (17), and means including a pair of analog-to-digital converters (15, 16) for supplying to the input terminals of said digital divider means signals corresponding with the voltage (u) and current values ($i_L$) of said sensor winding, respectively.

7. apparatus as defined in claim 1, wherein sensor winding means comprises as additional winding (8) mounted on said load receiving member in thermal contact with said load compression winding.

8. Apparatus as defined in claim 7, wherein said additional winding comprises a winding having a meandering configuration.

9. Apparatus as defined in claim 7, wherein said resistance measuring means includes an alternating-current voltage source.

* * * * *